Oct. 1, 1963    B. H. WERRA ET AL    3,105,516
BALL CHECK VALVES
Filed Dec. 4, 1961

INVENTOR.
BRUNO H. WERRA
THOMAS A. GEARY
BY
Morsell & Morsell
ATTORNEYS.

United States Patent Office 3,105,516
Patented Oct. 1, 1963

3,105,516
BALL CHECK VALVES
Bruno H. Werra, Waukesha, and Thomas A. Geary, Kenosha, Wis., assignors to Ladish Co., Cudahy, Wis., a corporation of Wisconsin
Filed Dec. 4, 1961, Ser. No. 156,791
3 Claims. (Cl. 137—533.11)

This invention relates to improvements in ball check valves.

The conventional check valve usually includes a number of separable parts including a spring and a cage, and these parts are likely to get loose at high velocities and cause trouble. In addition, the use of conventional check valves is improper in certain environments because of conditions of flow resistance or vibration, as for example, on the inlet side of a centrifugal pump.

While ball check valves have heretofore been proposed, such valves have involved arrangements where the valve seat created an obstruction of an objectionable nature, making such valves unsuitable for use in dairy lines or the like where sanitation is an important factor.

A general object of the invention is, therefore, to provide a check valve as above described having an integral non-obstructing seat formed by a novel form of Y-fitting.

It is a further object of the present invention to provide an improved check valve which eliminates a number of the parts usually required in check valves, the improved valve being operable with a minimum of noise.

A more specific object of the invention is to provide a Y-type ball check valve constructed in a novel manner whereby the ball floats quietly in an intermediate position in the length of the Y-branch when liquid is passing normally through the valve, the arrangement being such that part of the liquid creates a cushion between the ball and a capped end of the Y-branch to prevent the ball from bobbling back and forth.

A further object of the invention is to provide an improved check valve wherein the ball may be readily removed for replacement or cleaning and wherein all parts of the valve body are readily accessible from the open end of the Y-branch for cleaning.

Other objects of the invention are to provide a ball check valve wherein the unit is self-draining and capable of being readily cleaned-in-plane whereby it is better suited for use in dairy lines.

With the above and other objects in view the invention consists of improved check valve, and all of its parts in combination, as set forth in the claims, and all equivalents thereof.

In the accompanying drawing, illustrating one complete embodiment of the preferred form of the invention, in which the same reference numerals designate the same parts in all the views.

Figure 1:
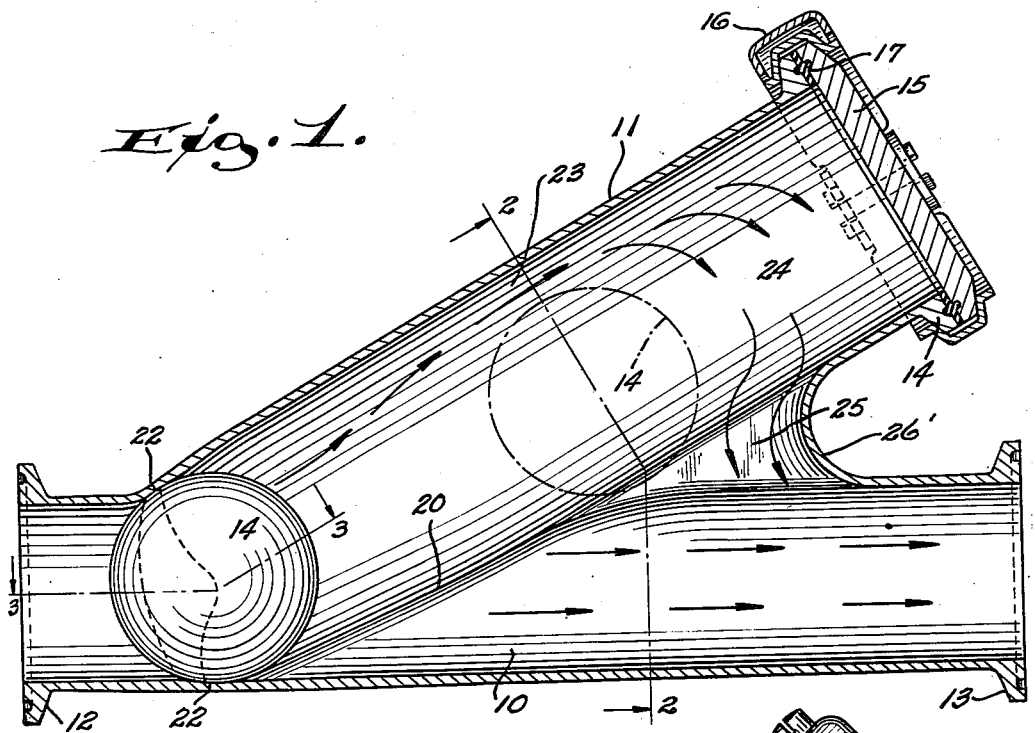
FIG. 1 is a longitudinal sectional view through the improved valve, the ball being shown by full lines in closing position and by dot-dash lines in open position.

Referring more particularly to the drawings, the valve body illustrated in FIG. 1 may be formed of suitable material which is usually stainless steel in the case of a valve to be used in dairies. The valve is generally a Y-fitting including a main flow line 10 with an integral Y-branch 11 projecting upwardly therefrom. The main portion 10 includes a flanged inlet end 12 and a flanged outlet end 13 which are adapted to be coupled into a dairy line or other place of use. The outer end of the branch 11 is flanged as at 14 and is adapted to be removably closed by a cap 15 which is detachably held in closing position by a removable ring clamp 16 of any well-known type, there being a gasket 17 interposed between the meeting faces of the flange 14 and cap.

The ball 18 may be formed in any desired manner, but it is preferred to use a hollow metal shell which is coated with a relatively hard rubber or rubber-like material such as buna-N.

The diameter of the main flow portion 10 is less than the diameter of the branch 11. In a case where the main line has an outside diameter of 1½ inches, the branch 11 will have an outside diameter of 2 inches. In this example, the inside diameter of the main line will be approximately 1⅜ inches and the inside diameter of the outer portion of the branch 11 will be 1⅞ inches. In this example the ball will be 1⅝" in diameter.

Figure 3:
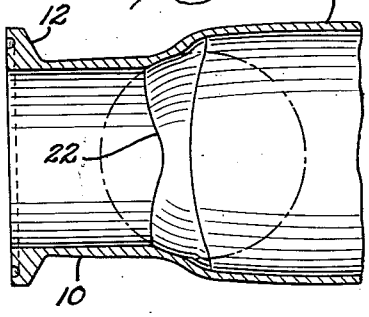
FIG. 3 is a sectional view taken on the line 3—3 of FIG. 1.
Figure 2:
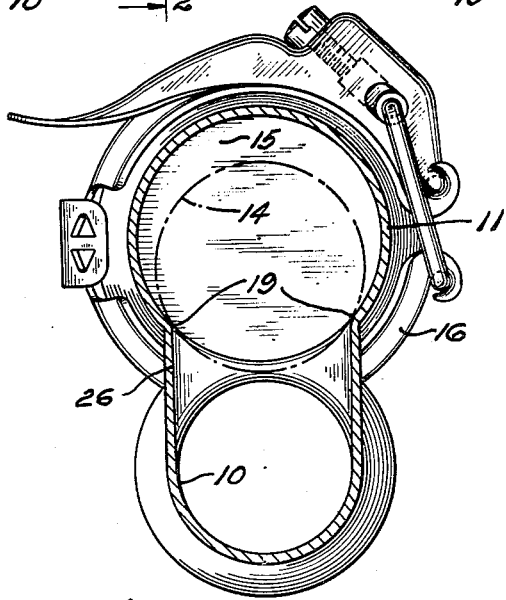
FIG. 2 is a sectional view taken on the line 2—2 of FIG. 1.

As shown in FIGS. 2 and 3 the branch merges integrally with the main flow portion 10 with a result that at the section shown in FIG. 2, due to the differences in diameter, the ball will ride on juncture lines 19 when floating in the dot-dash line position of FIG. 1. It is also to be noted that there is a merger line 20 between the branch conduit and the main conduit which tapers inwardly as shown to provide a progressively smaller diameter toward the valve seat. There is also a transition area at 21 where the branch 11 narrows into merging relationship with the main line 10. At the merger there is an annular valve seat 22, the extent of which is indicated by dotted lines in FIG. 1. The seat area is recessed slightly into the walls of the valve body so that it is spherical to match the contour of the ball. Thus, when the ball is in the full line closing position of FIG. 1, it seats smoothly on the spherical valve seat 22, which seat conforms to the external surface of the ball when the ball is in the full line closing position of FIG. 1. With this novel arrangement of having an integral branch which merges in such a way as to form an integral valve seat, no separate valve seat member has to be utilized. Such separate valve seat member is objectionable in sanitary lines as it creates projections which trap food particles and which make cleaning difficult.

In use of the improved check valve the liquid will normally flow in the direction indicated by the arrows, that is, from left to right in FIG. 1. For a check valve having a main body which is 1½" O.D. the maximum flow rate of the liquid such as milk is in the neighborhood of 60 gallons per minute, where in a larger size line such as a 2" line, the maximum flow rate is in the neighborhood of 150 gallons per minute.

With the liquid flowing at this rate the ball 18 will, of course, be moved off of its seat and will be guided by the guiding portions 19, shown in FIG. 2, to an elevated intermediate position in the branch line 11 to permit the main flow to move straight through the line 10 without obstruction. Due to the fact that the ball 18 is substantially smaller in diameter than the branch 11, as shown in FIG. 2, there will be a relatively large space 23 above the ball. A certain amount of the liquid will pass through this space into the area 24 above the ball. Here it will be stopped by the cap 15. It is to be noted, however, that the valve is so worked out that there is a hollow web connection at 26 providing a return passageway 25 with a smoothly rounded wall portion 26' so that liquid that passes above the ball can continually return through the passageway 25 as indicated by the arrows in FIG. 1 and rejoin the main conduit. This moving liquid in the spaces 24 and 25 creates a cushion which limits the upward movement of the ball and prevents it, with normal flow velocity, from hitting the cap 15 and bobbling back and forth against it so as to create noise and objectionable turbulence. Such turbulence is undesirable as it has an objectionable effect upon the cream line in dairies.

When the pressure in the line 10 drops, shutting off the liquid flow, the ball 18 will automatically roll back to the full line closing position of FIG. 1 in engagement with the integral spherical seat. It thus provides a simple effective check and prevents undesirable backflow.

The valve can be used either in the horizontal position illustrated or in a vertical position as long as the Y-branch projects upwardly so that gravity can act on the ball.

Various changes and modifications may be made without departing from the spirit of the invention and all of such changes are contemplated as may come within the scope of the claims.

What we claim is:

1. A check valve comprising a straight main conduit with a bore, an integral branch conduit merging at an acute angle therewith and having an outer end and having a bore which is of greater diameter than said main conduit bore to provide guiding tracks and to provide an integral internal annular valve seat formed by the merger of said branch conduit bore with said main conduit bore, which seat is of less diameter than the bore of said branch conduit and of greater diameter than the bore of said main conduit, means removably closing the outer end of said branch conduit, and a ball of substantially less diameter than said branch conduit bore and of greater diameter than said main conduit bore supported on said tracks in said branch conduit bore for movement from a position in engagement with said seat to a position in said branch conduit where it no longer obstructs movement of liquid through the main conduit, said branch conduit being of such length that there is a branch conduit portion beyond the ball when the latter is in said non-obstructing position, there being a hollow web between said branch conduit and main conduit positioned to provide a free return passageway for liquid which passes into the upper portion of said branch conduit beyond said ball when the latter is in said non-obstructing position with respect to the main conduit.

2. A check valve comprising a main conduit with a bore, an integral branch conduit merging at an acute angle therewith and having a bore of greater diameter than said main conduit bore, there being an internal annular valve seat at the merger of said branch conduit bore and main conduit bore, a hollow web connection between said branch conduit and main conduit providing a return passageway between the upper portion of the bore of the branch and a portion of the bore of the main conduit which is upstream of the valve seat, and a ball of greater diameter than said main conduit bore supported in said branch conduit bore for movement into and out of engagement with said valve seat, said ball being of substantially less diameter than said branch conduit bore so that when the valve is open liquid may flow over the ball into the upper portion of the branch conduit to cushion the ball and normally maintain it in an intermediate position relative to the length of said branch conduit, said branch conduit being sufficiently long that when the ball is in said intermediate position it is non-obstructing with respect to flow through said main conduit, said return passageway in the hollow web being so located as to provide means whereby said liquid in the upper portion of said branch conduit may freely and continually flow back into the main conduit to rejoin the main stream when the ball is in said non-obstructing position with respect to the main conduit.

3. A check valve comprising a main conduit with a bore, an integral branch conduit merging at an acute angle therewith and having a bore of greater diameter than said main conduit bore to provide guiding tracks along said merger, there being an internal annular valve seat at the end of the merger of said branch conduit bore and main conduit bore, a hollow web connection between said branch conduit and main conduit providing a return passageway between the upper portion of the bore of the branch and a portion of the bore of the main conduit which is upstream of the valve seat, and a ball of greater diameter than said main conduit bore supported in said branch conduit bore for movement on said guiding tracks into and out of engagement with said valve seat, said ball being of substantially less diameter than said branch conduit bore so that when the valve is open and the ball is on said guiding tracks liquid may flow over the ball into the upper portion of the branch conduit to cushion the ball and normally maintain it in an intermediate position of the length of said branch conduit, said branch conduit being sufficiently long that when the ball is in said intermediate position it is non-obstructing with respect to flow through said main conduit, said return passageway in the hollow web being so located as to provide means whereby said liquid in the upper portion of said branch conduit may freely and continually flow back into the main conduit to rejoin the main stream when the ball is in said non-obstructing position with respect to the main conduit.

References Cited in the file of this patent
UNITED STATES PATENTS

| | | |
|---|---|---|
| 841,474 | Wendelken | Jan. 15, 1907 |
| 1,700,234 | McCrosky | Jan. 29, 1929 |